US012649371B2

(12) United States Patent
Woo

(10) Patent No.: US 12,649,371 B2
(45) Date of Patent: Jun. 9, 2026

(54) ELECTRIC VEHICLE AND METHOD FOR CONTROLLING DRIVING THEREOF

(71) Applicants: Hyundai Motor Company, Seoul (KR); Kia Corporation, Seoul (KR)

(72) Inventor: Min Soo Woo, Seoul (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 296 days.

(21) Appl. No.: 17/895,821

(22) Filed: Aug. 25, 2022

(65) Prior Publication Data

US 2023/0138908 A1     May 4, 2023

(30) Foreign Application Priority Data

Oct. 28, 2021     (KR) ........................ 10-2021-0145407

(51) Int. Cl.
    *B60L 15/20*        (2006.01)
    *G05B 17/02*        (2006.01)
(52) U.S. Cl.
    CPC .............. *B60L 15/20* (2013.01); *G05B 17/02* (2013.01); *B60L 2240/26* (2013.01); *B60L 2240/64* (2013.01); *B60L 2240/66* (2013.01)
(58) Field of Classification Search
    CPC .. B60L 15/20; B60L 2240/26; B60L 2240/64; B60L 2240/66; G05B 17/02
    See application file for complete search history.

(56) References Cited

U.S. PATENT DOCUMENTS 6,990,401 B2    1/2006  Neiss et al.
8,200,346 B2    6/2012  Thiele 8,700,256 B2    4/2014   Duraiswamy et al.
8,914,213 B2    12/2014  Chimner et al.
9,248,836 B2    2/2016   Johansson et al.
9,511,668 B2    12/2016  Johansson et al.
2011/0077798 A1*  3/2011  Nishizawa ............ B60W 40/06
                                                          701/1

(Continued)

FOREIGN PATENT DOCUMENTS

CA        2372383 A1 *  6/1999  .............. C08F 10/00
CN      113415174 A  *  9/2021  .............. B60L 58/10

(Continued)

OTHER PUBLICATIONS

Gabriele Pannocchia, Offset-free tracking Mpc: A tutorial review and comparison of different formulations, Abstract (Year: 2015).*

*Primary Examiner* — Rachid Bendidi

*Assistant Examiner* — Joseph Anderson Yanoska

(74) *Attorney, Agent, or Firm* — MORGAN, LEWIS & BOCKIUS LLP

(57)                    ABSTRACT

A method for controlling driving of an electric vehicle includes calculating an error between a vehicle output value output from the electric vehicle which is traveling and a model output value output from a control model of the electric vehicle for controlling the electric vehicle, analyzing the calculated error and determining an error factor causing the error based on analyzed result values, generating a weight corresponding to the determined error factor and applying the weight to a parameter to obtain an estimated parameter, and reflecting the estimated parameter in the control model when a vehicle input value input to the electric vehicle satisfies a predetermined condition.

19 Claims, 11 Drawing Sheets

(56)  References Cited

U.S. PATENT DOCUMENTS

| | | | | | |
|---|---|---|---|---|---|
| 2015/0352972 | A1 * | 12/2015 | Li | ............................ | B60L 58/12 429/62 |
| 2018/0001788 | A1 * | 1/2018 | Geur | ........................ | B60L 53/50 |
| 2020/0207412 | A1 | 7/2020 | Al Assad et al. | | |

FOREIGN PATENT DOCUMENTS

| | | | | | |
|---|---|---|---|---|---|
| EP | 2805861 | A2 * | 11/2014 | ............ | B60W 40/13 |
| JP | 2011188679 | A * | 9/2011 | .............. | B60L 53/62 |
| JP | 2021049882 | A * | 4/2021 | | |
| KR | 10 2004-0107771 | A | 12/2004 | | |
| KR | 10 1836153 | B1 | 3/2018 | | |
| KR | 20180045425 | A * | 5/2018 | .......... | B60W 40/107 |
| KR | 20200018163 | A * | 2/2020 | ............ | B60W 40/12 |
| KR | 10 2020-0053412 | A | 5/2020 | | |
| KR | 10 2021-0006926 | A | 1/2021 | | |
| KR | 10 2021-0050303 | A | 5/2021 | | |
| WO | WO-2019203022 | A1 * | 10/2019 | ...... | B60W 60/00184 |
| WO | WO-2020200433 | A1 * | 10/2020 | .......... | B60W 60/001 |
| WO | WO-2020229051 | A1 * | 11/2020 | ............ | G05B 17/02 |

* cited by examiner

Past time            Present time

Past time            Present time

ELECTRIC VEHICLE AND METHOD FOR CONTROLLING DRIVING THEREOF

CROSS-REFERENCE TO RELATED APPLICATION

The present application claims priority to Korean Patent Application No. 10-2021-0145407, filed on Oct. 28, 2021, the entire contents of which is incorporated herein for all purposes by this reference.

BACKGROUND OF THE PRESENT DISCLOSURE

Field of the Present Disclosure

The present disclosure relates to an electric vehicle and a method for controlling driving thereof capable of detecting factors that cause errors during longitudinal driving, distinguishing a steady factor from an instant factor with respect to the errors, and correcting parameters based thereon to improve the stability of control.

Description of Related Art

As interest in the environment has recently increased, various hybrid electric vehicles (HEVs) or electric vehicles (EVs) using an electric motor as a driving source are under development.

A hybrid electric vehicle (HEV) generally refers to a vehicle that utilizes two power sources together, and the two power sources are mainly an engine and an electric motor. Such hybrid electric vehicles have been developed in various manners in recent years because they are advantageous in reducing exhaust gas as well as having excellent fuel efficiency and power performance as compared to vehicles having only an internal combustion engine. A hybrid electric vehicle capable of charging a battery through a plug using external power rather than engine power or regenerative braking is referred to as a plug-in hybrid electric vehicle (PHEV).

FIG. 1 is a diagram illustrating a conventional method for controlling driving of an electric vehicle.

Referring to FIG. 1, in a conventional electric vehicle or hybrid vehicle (hereinafter referred to as a plant), an electric motor is widely used to drive the vehicle and various control models (or control algorithms) for high-speed and high-precision control of such an electric motor are being researched and developed.

Furthermore, a proportional-integral-derivative (PID) controller and a disturbance observer (DOB) are widely used as the aforementioned control models (or control algorithms), and the disturbance observer plays an important role in estimating disturbance having influence on a plant including an electric motor based on mathematical modeling of the plant and compensating for the disturbance.

When errors occur in such a normal control model (or control algorithm) and plant, the errors are fed back in the form of scalar values, and when factors causing the errors have different characteristics, there is a problem in the stability of input.

Conventional methods are usually focused on errors that occur steadily (offset-free methods) in a method for compensating for differences between a control model (or control algorithm) and a plant, and in environments where disturbances having various characteristics exist, there is a problem of causing a sudden change in an input value (torque) in the process of compensating for the disturbances.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electric vehicle and a method for controlling driving thereof configured for detecting factors that cause errors while driving, distinguishing a steady factor from an instant factor with respect to the errors, and correcting parameters based thereon to improve the stability of control in implementation of an optimal driving model or algorithm for electric vehicles.

The technical problems to be achieved in an exemplary embodiment of the present disclosure are not limited to the technical problems mentioned above, and other technical problems that are not mentioned will be clearly understood by those skilled in the art to which an exemplary embodiment of the present disclosure belongs from the description below.

To achieve these objects and other advantages and in accordance with the purpose of the present disclosure, as embodied and broadly described herein, a method for controlling driving of an electric vehicle includes calculating an error between a vehicle output value output from the electric vehicle which is traveling and a model output value output from a control model of the electric vehicle for controlling the electric vehicle, analyzing the calculated error and determining an error factor causing the error based on analyzed result values, generating a weight corresponding to the determined error factor and applying the weight to a parameter to obtain an estimated parameter, and reflecting the estimated parameter in the control model when a vehicle input value input to the electric vehicle satisfies a predetermined condition.

In another aspect of the present disclosure, an electric vehicle includes a processor for controlling the electric vehicle which is traveling on a road, the processor including a calculation unit configured to calculate an error between a vehicle output value output from the electric vehicle which is traveling and a model output value output from a control model of the electric vehicle for controlling the electric vehicle, a determination unit configured to receive and analyze the error from the calculation unit and to determine an error factor causing the error based on analyzed result values, an estimation unit configured to receive the error factor from the determining unit, to generate a weight corresponding to the error factor, and to apply the generated weight to a parameter to obtain an estimated parameter, and a compensation unit configured to reflect the estimated parameter in the control model when a vehicle input value input to the electric vehicle satisfies a predetermined condition.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
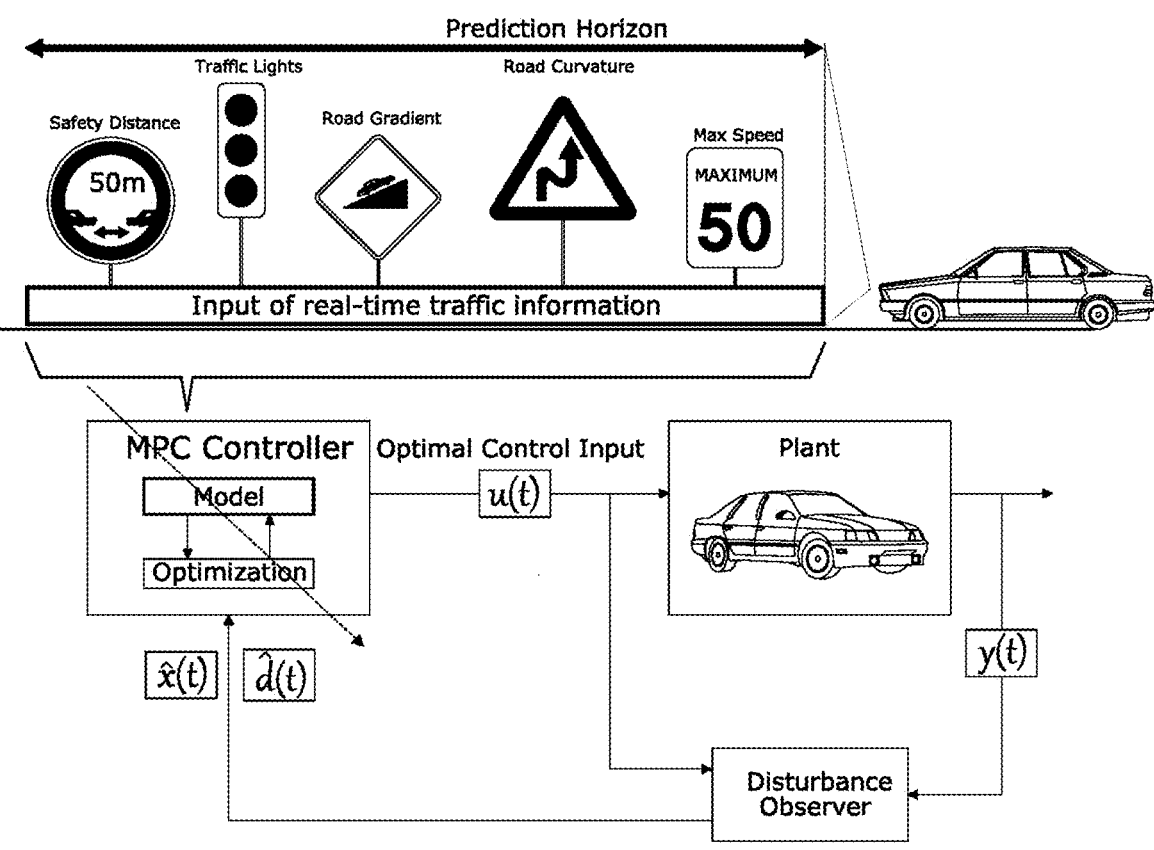
FIG. 1 is a diagram illustrating a conventional method for controlling driving of an electric vehicle.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings so that those of ordinary skill in the art can easily implement the same. However, the present disclosure may be implemented in various different forms and is not limited to the exemplary embodiments described herein. To clearly describe the present disclosure in the drawings, parts irrelevant to the description are omitted and similar reference numerals are attached to similar parts throughout the specification.

Throughout the specification, when a part "includes" a certain component, this means that other components may be further included, rather than excluding other components, unless otherwise stated. In addition, parts indicated by the same reference numerals throughout the specification refer to the same components.

To overcome the conventional problems, the exemplary embodiments of the present disclosure provide a method for realizing more stable input and estimating a steady factor and an instant factor with respect to a mismatch in a distinguishing manner to control optimal driving of an electric vehicle by proposing a method of detecting factors that cause errors and compensating for the factors.

Figure 2:
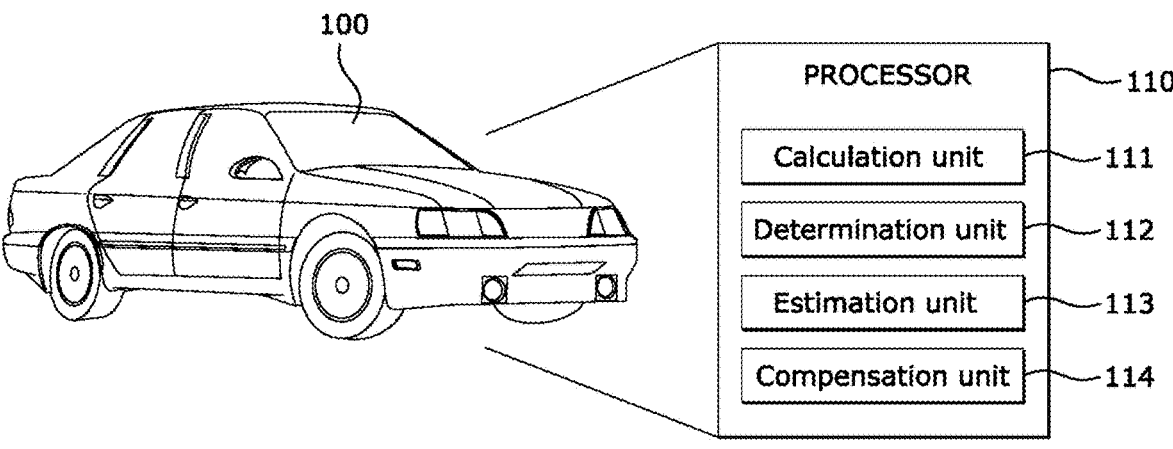
FIG. 2 is a diagram illustrating a processor included in an electric vehicle according to various exemplary embodiments of the present disclosure.
Figure 3:
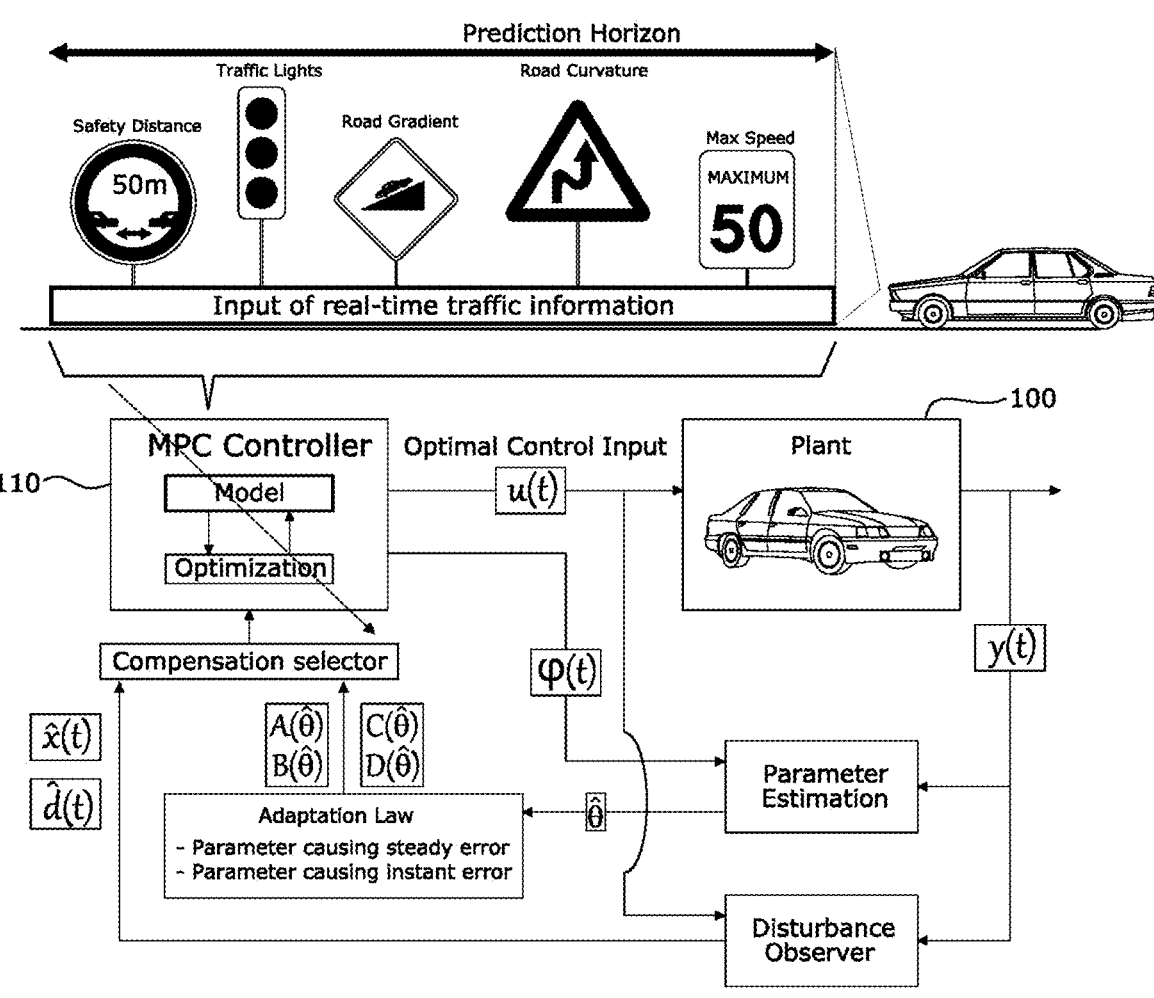
FIG. 3 is a diagram illustrating an operation of the processor for controlling an electric vehicle according to various exemplary embodiments of the present disclosure.

FIG. 2 is a diagram illustrating a processor included in an electric vehicle according to various exemplary embodiments of the present disclosure, and FIG. 3 is a diagram illustrating an operation of the processor for controlling an electric vehicle according to various exemplary embodiments of the present disclosure.

Referring to FIG. 2 and FIG. 3, the electric vehicle 100 according to various exemplary embodiments of the present disclosure may include a processor 110 for controlling the electric vehicle 100 which is traveling on a road.

The processor 110 may collect information on road signs provided on actual roads, information on the surrounding environment of the electric vehicle 100, real-time traffic information, etc. from the electric vehicle 100 which is traveling on the actual roads and generate a first input value and a second input value optimized for the electric vehicle 100. The processor 110 may include an optimization algorithm for determining the first input value and a model predictive control algorithm for estimating the second input value.

The processor 110 may input the first input value optimized for the electric vehicle 100 to optimally control the electric vehicle 100 which is traveling. The first input value may be determined using the optimization algorithm. The optimization algorithm may be a model-based control algorithm for simulating a plant. The plant may be referred to as the electric vehicle 100. The first input value may be referred to as an optimal vehicle input value. That is, the electric vehicle 100 may receive the optimal vehicle input value under the control of the processor 110 and output a vehicle output value.

The processor 110 may input the second input value optimized for a control model using the model predictive control algorithm or program. The second input value may be referred to as an optimal model input value or an optimal estimated input value. That is, the control model may receive the optimal model input value under the control of the processor 110 and output an output value of the control model.

The model predictive control algorithm may be based on a state space equation derived through an equation of motion in the longitudinal direction of a plant. The state variable model cannot accurately simulate the plant because various parameters generated in the plant during actual driving cannot be perfectly applied to the plant. Accordingly, the state variable model inevitably causes predetermined errors in the plant.

That is, the state variable model may use various parameters to simulate a plant, but it is impossible to completely simulate the plant because the various parameters continuously change during actual driving. Various parameters may include a rolling resistance coefficient, an aerodynamic coefficient, a vehicle weight, the influence of wind while driving, road friction characteristics, etc.

The processor 110 may be referred to as a model predictive control (MPC) processor 110 or an MPC controller.

The above-described processor 110 may include a calculation unit 111, a determination unit 112, an estimation unit 113, and a compensation unit 114.

The calculation unit 111 may calculate an error between a vehicle output value output from the electric vehicle 100 which is traveling and a model output value output from a control model that controls the electric vehicle 100 under the control of the processor 110. That is, the calculation unit 111 may calculate an error occurring between the electric vehicle 100 and the control model under the control of the processor 110. The error may be referred to as a mismatch.

The error may be defined as the sum of values obtained by dividing the squares of differences between model output values obtained when the optimal model input value is used as an input to the control model and vehicle output values when the optimal model input value is applied to the plant by the number of pieces of data. This is represented by Equation 1 as follows.

$$V_N(\theta) = \frac{1}{N} \sum_{t=1}^{N} (\hat{y}(t \mid \theta) - y(t))^2 \qquad \text{[Equation 1]}$$

$V_N(\theta)$ is the error formula, N is the number of data.

The determination unit 112 may receive and analyze the error provided by the calculation unit 111 and determine an error factor causing the error based on analyzed result values. That is, the determination unit 112 may determine whether differences between the plant and the control model, which cause the error, occur continuously or instantaneously.

The determination unit 112 may derive the error factor causing the error under the control of the processor 110 based on the analyzed result values. The determination unit 112 may determine that the derived error factor is a steady first error factor if it is included in a preset duration range and determine that the derived error factor is an instant second error factor if it is not included in the preset duration range.

For example, when there is a difference between a control model weight and an actual vehicle weight, the determination unit 112 may determine the derived error factor to be the first steady error factor that is continuously generated under the control of the processor 110. On the other hand, when there is a difference between the model and the vehicle due to the influence of wind while driving, the determination unit 112 may determine the derived error factor to be the second error factor that is instantaneously generated under the control of the processor 110.

The estimation unit 113 may receive the error factor from the determination unit 112, generate a weight corresponding to the error factor, and apply the generated weight to parameters to obtain estimated parameters.

The weight may include a first weight to which a first forgetting factor for compensating for the first error factor is applied and a second weight to which a second forgetting factor including a value smaller than the first forgetting factor is applied.

The estimation unit 113 may generate the first weight corresponding to the determined first error factor or generate the second weight corresponding to the determined second error factor under the control of the processor 110. The estimation unit 113 may obtain first estimated parameters by applying the first weight to the parameters and obtain second estimated parameters by applying the second weight to the parameters.

The first forgetting factor or the second forgetting factor may reflect characteristics of an error. That is, to reflect the characteristics of the error, the processor 110 may introduce the first forgetting factor or the second forgetting factor to assign different weights to the error.

That is, the estimation unit 113 may set or generate the first and second forgetting factors reflecting the characteristics of the error under the control of the processor 110. The first and second forgetting factors may be greater than 0 and less than 1. Equations 2 and 3 with respect to this are as follows.

$$V_N(\theta) = 1 \cdot e^2(t) + \alpha e^2(t-1) + \cdots + \alpha^{t-1} e^2(1), \qquad \text{[Equation 2]}$$

$$e(t) = \hat{y}(t \mid \theta) - y(t), \, 0 < \alpha \le 1 \qquad \text{[Equation 3]}$$

$\alpha$ is forgetting factor. $V_N$: Error formula reflecting the forgetting factor, e is difference between the estimated value and the measured value, t is time step, Theta is the parameter to estimate.

For example, in the case of continuously occurring errors, the processor 110 may set or generate the first forgetting factor. In the instant case, the first forgetting factor may be set to a value close to 1. The processor 110 may set the second forgetting factor in the case of instantaneously occurring errors. In the instant case, the second forgetting factor has a value less than the first forgetting factor and may be set to a value much smaller than 1. For example, the first forgetting factor may be set to 0.5 or more and 1 or less and the second forgetting factor may be set to 0 or more and less than 0.5. A detailed description thereof will be provided later.

When the vehicle input value input to the electric vehicle 100 satisfies a predetermined condition, the compensation unit 114 may reflect the estimated parameters in the control model or compensate for the same.

When the vehicle input value input to the electric vehicle 100 under the control of the processor 110 does not satisfy the predetermined condition, the compensation unit 114 may reflect parameters in the control model.

Here, the predetermined condition may be a condition in which the vehicle input value input to the electric vehicle 100 is equal to or greater than 0 torque. That is, as a predetermined condition for estimating parameters, a condition in which the vehicle input value input to the electric vehicle 100 is equal to or greater than 0 torque may be required. In other words, to estimate parameters, a certain amount or more of input values must be applied to the plant. For example, when an optimal input value is 0 torque, it may not be possible to estimate errors because there is no factor that changes the plant. In order to reflect this, it is desirable that the vehicle input value be equal to or greater than 0 torque.

Furthermore, the compensation unit 114 may determine whether the estimated parameters are valid. If it is determined that the validity of the estimated parameters is satisfied, the compensation unit 114 may determine the estimated parameters as final parameters and input the final parameters to the control model.

If it is determined that the validity of the estimation parameters is not satisfied, the compensation unit 114 may determine the estimated parameters as constant parameters and input the constant parameters to an offset-free model. Here, the constant parameters may be set to constant errors within a prediction horizon. The offset-free model may be referred to as an offset-free algorithm or an offset-free method.

The offset-free model may be a model or a method in which an error factor causing mismatch is solved on the assumption that it is constant within a prediction horizon.

The offset-free model can maintain a certain level of control because it determines errors with various characteristics as a single constant error.

The compensation unit 114 may determine that the estimated parameters are valid when physical characteristics with respect to the estimated parameters exist due to disturbance having a completely different characteristic in the electric vehicle 100 which is traveling under the control of the processor 110. The compensation unit 114 may determine that the estimated parameters are not valid if there are no physical characteristics with respect to the estimated parameters due to disturbance having a completely different characteristic in the electric vehicle 100 which is traveling under the control of the processor 110.

As described above, when estimated parameters lose physical characteristics due to disturbance having a completely different characteristic which is not predicted in an actual driving situation, the compensation unit 114 may implement parameters using the offset-free model instead of estimation. For example, a case where an estimated parameter loses physical characteristics may be a case where an estimated weight value is negative or an estimated rolling resistance value is infinitely large.

When errors occur between the control model and the plant, the above-described processor 110 may estimate parameters causing a difference between an output value of the control model and an output value of the plant based on the difference to generate corresponding parameters and estimate the generated parameters by dividing them into a parameter continuously generated in the plant and a parameter instantaneously generated in the plant. Furthermore, the processor 110 may control the offset-free method of the base to be used when the estimated parameters are not valid or a numerical value having no physical meaning is generated.

Figure 4:
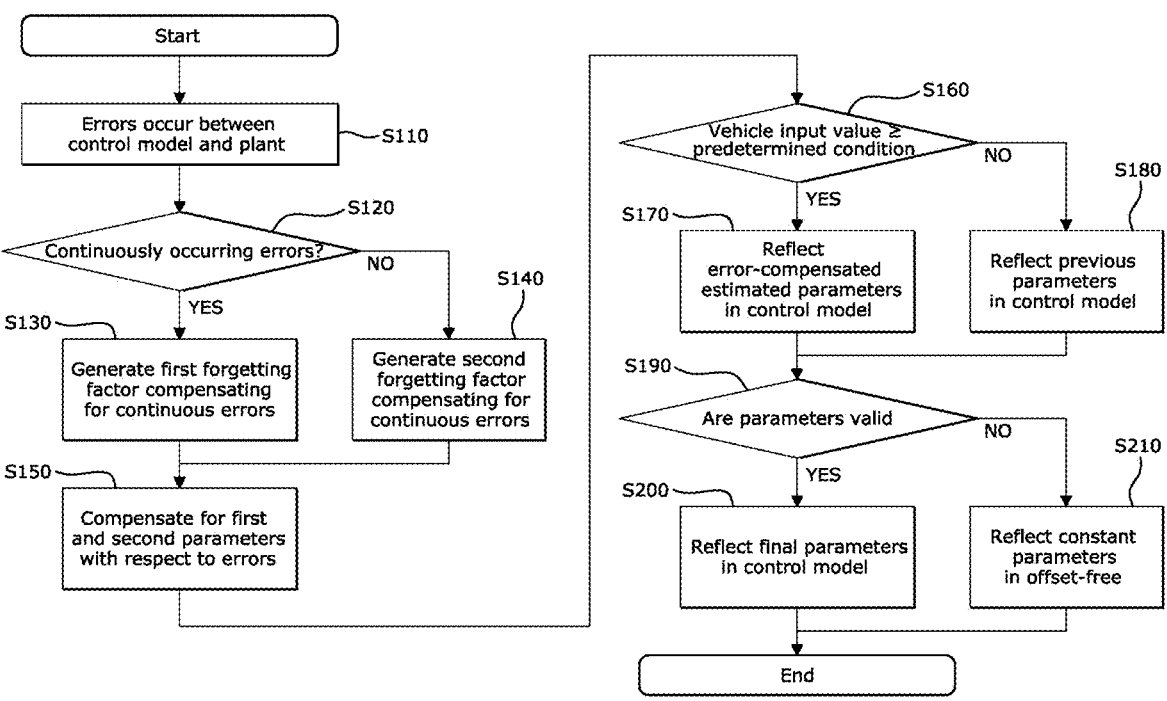
FIG. 4 is a flowchart illustrating a method for controlling driving of an electric vehicle according to various exemplary embodiments of the present disclosure.

FIG. 4 is a flowchart illustrating a method for controlling driving of an electric vehicle according to various exemplary embodiments of the present disclosure.

Referring to FIG. 4, the method for controlling driving of an electric vehicle according to an exemplary embodiment of the present disclosure may include calculating, determining, estimating, and reflecting steps.

In the calculating step, an error between a vehicle output value output from the electric vehicle which is traveling and a model output value output from a control model of the electric vehicle for controlling the electric vehicle may be calculated (S110). In the calculating step, the error between the electric vehicle and the control model may be calculated under the control of a processor. The error may be referred to as mismatch.

The above-described processor may be referred to as a model predictive control (MPC) processor or an MPC controller. The processor may include an optimization algorithm for determining a first input value and a model predictive control algorithm for estimating a second input value.

The processor may collect information on road signs provided on actual roads, information on the surrounding environment of the electric vehicle, and real-time traffic information from the electric vehicle which is traveling on the actual roads and generate the first input value and the second input value optimized for the electric vehicle.

The processor may input the first input value optimized for the electric vehicle to optimally control the electric vehicle which is traveling. The first input value may be determined using the optimization algorithm. The optimization algorithm may be a model-based control algorithm simulating a plant. The plant may be referred to as an electric vehicle. The first input value may be referred to as an optimal vehicle input value. That is, the electric vehicle may receive the optimal vehicle input value under the control of the processor and output a vehicle output value.

The processor may input the second input value optimized for the control model using the model predictive control algorithm or program. The second input value may be referred to as an optimal model input value or an optimal estimated input value. That is, the control model may receive the optimal model input value under the control of the processor and output an output value of the control model.

The model predictive control algorithm may be based on a state space equation derived through an equation of motion in the longitudinal direction of the plant. The state variable model cannot accurately simulate the plant because various parameters generated in the plant during actual driving cannot be perfectly applied to the plant. Accordingly, the state variable model inevitably causes a predetermined error in the plant.

That is, the state variable model may use various parameters to simulate a plant, but it is impossible to completely simulate the plant because the various parameters continuously change during actual driving. Various parameters may include a rolling resistance coefficient, an aerodynamic coefficient, a vehicle weight, the influence of wind while driving, road friction characteristics, etc.

Therefore, the error may be defined as the sum of values obtained by dividing the squares of differences between model output values obtained when the optimal model input value is used as an input to the control model and vehicle output values when the optimal model input value is applied to the plant by the number of pieces of data. This is represented by Equation 1 as follows.

$$V_N(\theta) = \frac{1}{N} \sum_{t=1}^{N} (\hat{y}(t \mid \theta) - y(t))^2 \qquad \text{[Equation 1]}$$

$V_N(\theta)$ is the error formula, N is the number of data.

In the determining step, the detected error may be analyzed and an error factor may be determined based on analyzed result values. The determining step may include deriving and determining steps.

That is, in the determining step, it may be determined whether differences between the plant and the control model, which cause the error, occur continuously or instantaneously (S120).

In the deriving step, the error may be analyzed under the control of the processor and the error factor causing the error may be derived based on analyzed result values. The error factor may include a first error factor and a second error factor.

In the determining step, the error factor derived under the control of the processor may be differently determined according to a preset duration range. For example, in the determining step, the error factor may be determined to be a steady first error factor if the error factor derived under the control of the processor deviates from the preset duration range. In the determining step, the error factor may be determined to be an instant second error factor if the error factor derived under the control of the processor does not deviate from the preset duration range.

For example, when there is a difference between a model weight and an actual vehicle weight, the processor is configured to determine the error factor to be a steady first error factor which is continuously generated by reflecting the difference. On the other hand, when there is a difference between the model and the vehicle due to the influence of wind while driving, the processor is configured to determine the error factor to be an instant second error factor which is instantaneously generated by reflecting the difference.

In the estimating step, a weight corresponding to the determined error factor may be generated under the control of the processor (S130 and S140) and the generated weight may be applied to a parameter to obtain an estimated parameter (S150).

The estimating step may include steps of generating a weight and compensating for the weight.

In the step of generating the weight, a first weight may be generated in response to the determined first error factor (S130) or a second weight may be generated in response to the determined second error factor (S140).

The weight may include a first weight and a second weight. The second weight may have a different value from the first weight. For example, the first weight may include a first forgetting factor that compensates for the first error factor. The second weight may include a second forgetting factor including a smaller value than the first forgetting factor.

The first forgetting factor or the second forgetting factor may reflect characteristics of the error. That is, to reflect the characteristics of the error, the processor may introduce the first forgetting factor or the second forgetting factor to assign different weights to the error.

That is, the processor may set or generate the first and second forgetting factors reflecting the characteristics of the error. The first and second forgetting factors may be greater than 0 and less than 1. Equations 2 and 3 with respect to this are as follows.

$$V_N(\theta) = 1 \cdot e^2(t) + \alpha e^2(t-1) + \cdots + \alpha^{t-1} e^2(1), \qquad \text{[Equation 2]}$$

$$e(t) = \hat{y}(t \mid \theta) - y(t), \ 0 < \alpha \le 1 \qquad \text{[Equation 3]}$$

$\alpha$ is forgetting factor. $V_N$: Error formula reflecting the forgetting factor, e is difference between the estimated value and the measured value, t is time step, Theta is the parameter to estimate.

For example, in the case of continuously occurring errors, the processor 110 may set or generate the first forgetting factor (S130). In the instant case, the first forgetting factor may be set to a value close to 1. The processor 110 may set the second forgetting factor in the case of instantaneously occurring errors (S140). In the instant case, the second forgetting factor has a value less than the first forgetting factor and may be set to a value much smaller than 1. For example, the first forgetting factor may be set to 0.5 or more and 1 or less and the second forgetting factor may be set to 0 or more and less than 0.5.

Figure 5A:
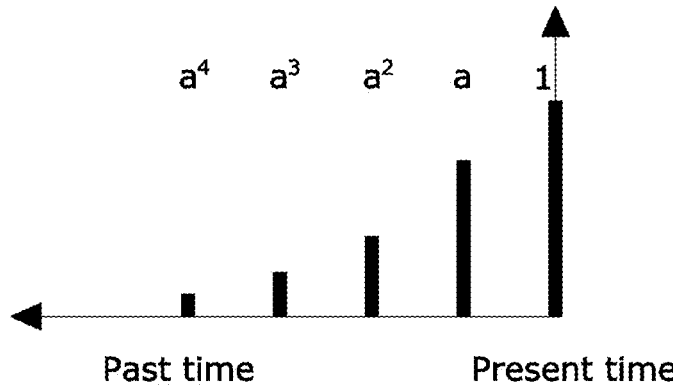
FIG. 5A and FIG. 5B are diagrams illustrating first and second forgetting factors according to various exemplary embodiments of the present disclosure.
Figure 5B:
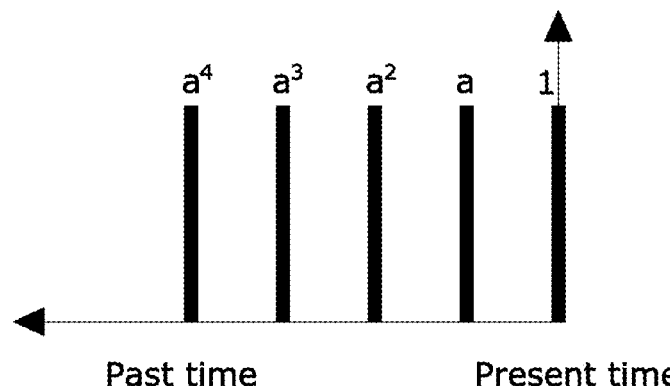

FIG. 5A and FIG. 5B are diagrams illustrating the first and second forgetting factors according to various exemplary embodiments of the present disclosure.

FIG. 5A is a graph showing the first forgetting factor set for continuous errors and FIG. 5B is a graph showing the second forgetting factor set for instant errors. The horizontal line represents time and the vertical line represents values for the forgetting factors.

As shown in FIG. 5A, in the case of continuously occurring errors, the first forgetting factor is multiplied by the errors according to characteristics of the continuously occurring errors, and thus almost the same weight may be reflected regardless of the past time or the present time. By reflecting this, the first weight may be generated.

On the other hand, as shown in FIG. 5B, in the case of instantaneously occurring errors, the second forgetting factor is multiplied by the errors according to characteristics of the instantaneously occurring errors, and thus an error of the past time is forgotten and a greater weight may be reflected in an error of the present time. By reflecting this, the second weight may be generated.

In the compensating step, the first weight or the second weight may be applied to the parameter to compensate for the parameter (S150). In the compensating step, the weight may be reflected in the error or the error may be compensated to estimate a parameter that causes the errors. For example, in the compensating step, a first parameter continuously causing errors may be estimated by reflecting the first weight in the parameter under the control of the processor.

In the compensating step, a second parameter causing instantaneously occurring errors may be estimated by reflecting the second weight in the parameter under the control of the processor.

In the reflecting step, when the vehicle input value input to the electric vehicle satisfies a predetermined condition (S160), the estimated parameter may be reflected in the control model (S170). On the other hand, when the vehicle input value input to the electric vehicle does not satisfy the predetermined condition in the reflecting step, the previous parameter before estimating the parameter may be reflected in the control model (S180).

As a predetermined condition for estimating the parameter, a condition in which the vehicle input value input to the electric vehicle is equal to or greater than 0 torque may be required. That is, to estimate the parameter, a certain amount of input values must be applied to the plant. For example, when an optimal input value is 0 torque, it may not be possible to estimate errors because there is no factor that changes the plant. To reflect this, it is desirable that the vehicle input value be equal to or greater than 0 torque.

Furthermore, the reflecting step may include the steps of determining whether the estimated parameter is valid (S190) and inputting a determined final parameter or a constant parameter (S200 and S210).

The step of determining the validity may include the step of determining the validity by checking the physical meaning and validity of the final parameter, which is a result obtained through the above-described steps.

That is, in the step of determining the validity, it may be determined that the estimated parameter is valid when physical characteristics with respect to the estimated parameter exist due to disturbance having a completely different characteristic in the electric vehicle which is traveling, and it may be determined that the estimated parameter is not valid if physical characteristics with respect to the estimated parameter do not exist.

In the step of determining the validity, it may be determined that the estimated parameter is determined to be a final parameter if the validity of the estimated parameter is satisfied, and it may be determined that the estimated parameter is determined to be a constant parameter when the validity of the estimated parameter is not satisfied.

In the inputting step, the final parameter may be input to the control model (S200) or the constant parameter may be input to the offset-free model (S210).

The constant parameter may be set as a constant error within a prediction horizon. The offset-free model may be referred to as an offset-free algorithm or an offset-free method.

The offset-free model may be a model or a method in which an error factor causing a mismatch is solved on the assumption that the error factor is constant within a prediction horizon. The offset-free model can maintain a certain level of control because it calculates errors with various characteristics as a single constant error.

As described above, in the reflecting step, when an estimated parameter loses physical characteristics due to disturbance including a completely different characteristic which is not predicted in an actual driving situation, the parameter may be implemented using the offset-free model instead of estimation. For example, a case where an estimated parameter loses physical characteristics may be a case where an estimated weight value is negative or an estimated rolling resistance value is infinitely large.

Examples of applying the method for controlling driving of an electric vehicle according to various exemplary embodiments of the present disclosure described above will be described with reference to FIG. 6A, FIG. 6B and FIG. 6C and FIG. 7A, FIG. 7B and FIG. 7C.

Figure 6A:
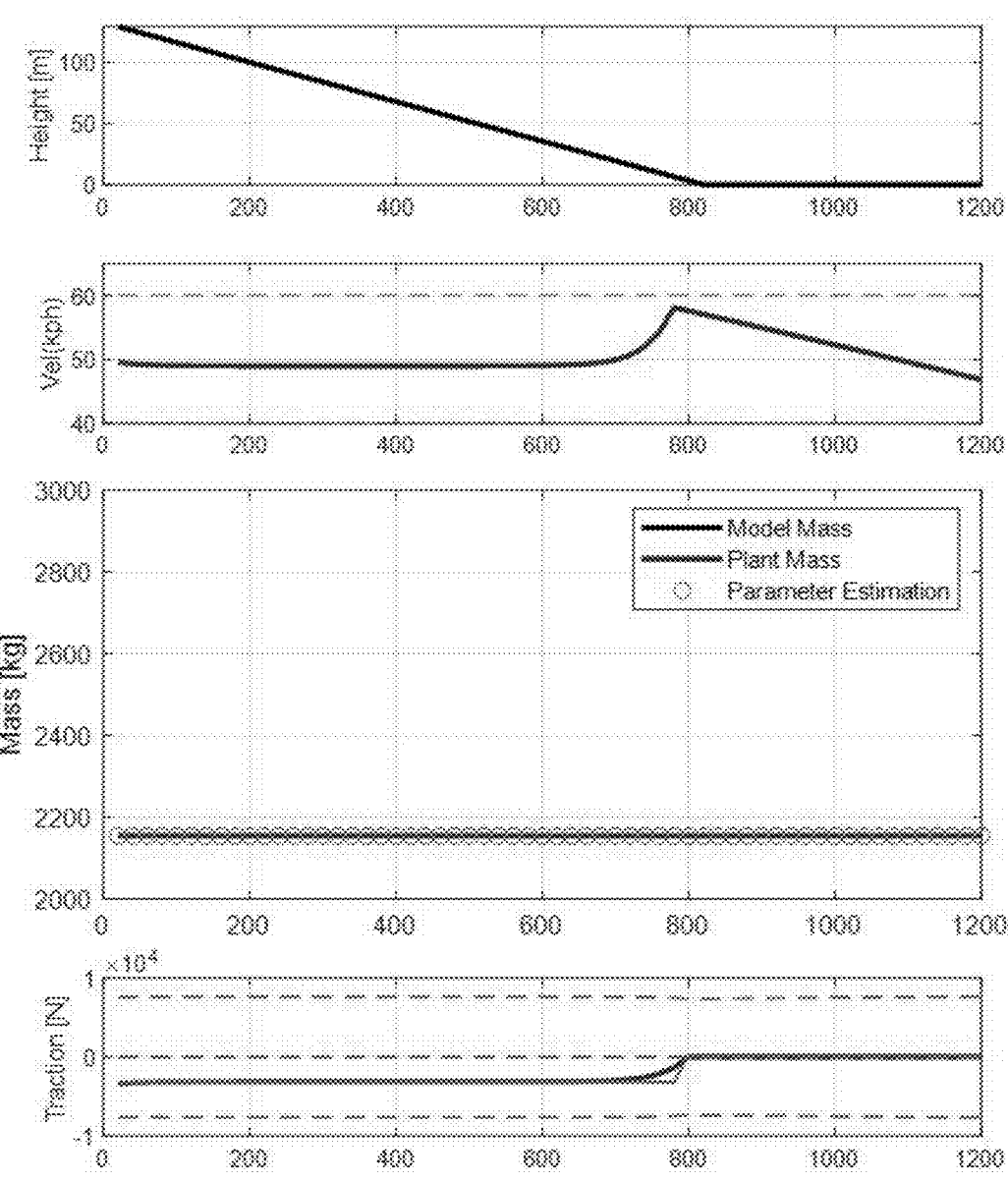
FIG. 6A, FIG. 6B and FIG. 6C are examples of applying the method for controlling driving of an electric vehicle according to various exemplary embodiments of the present disclosure.
Figure 6B:
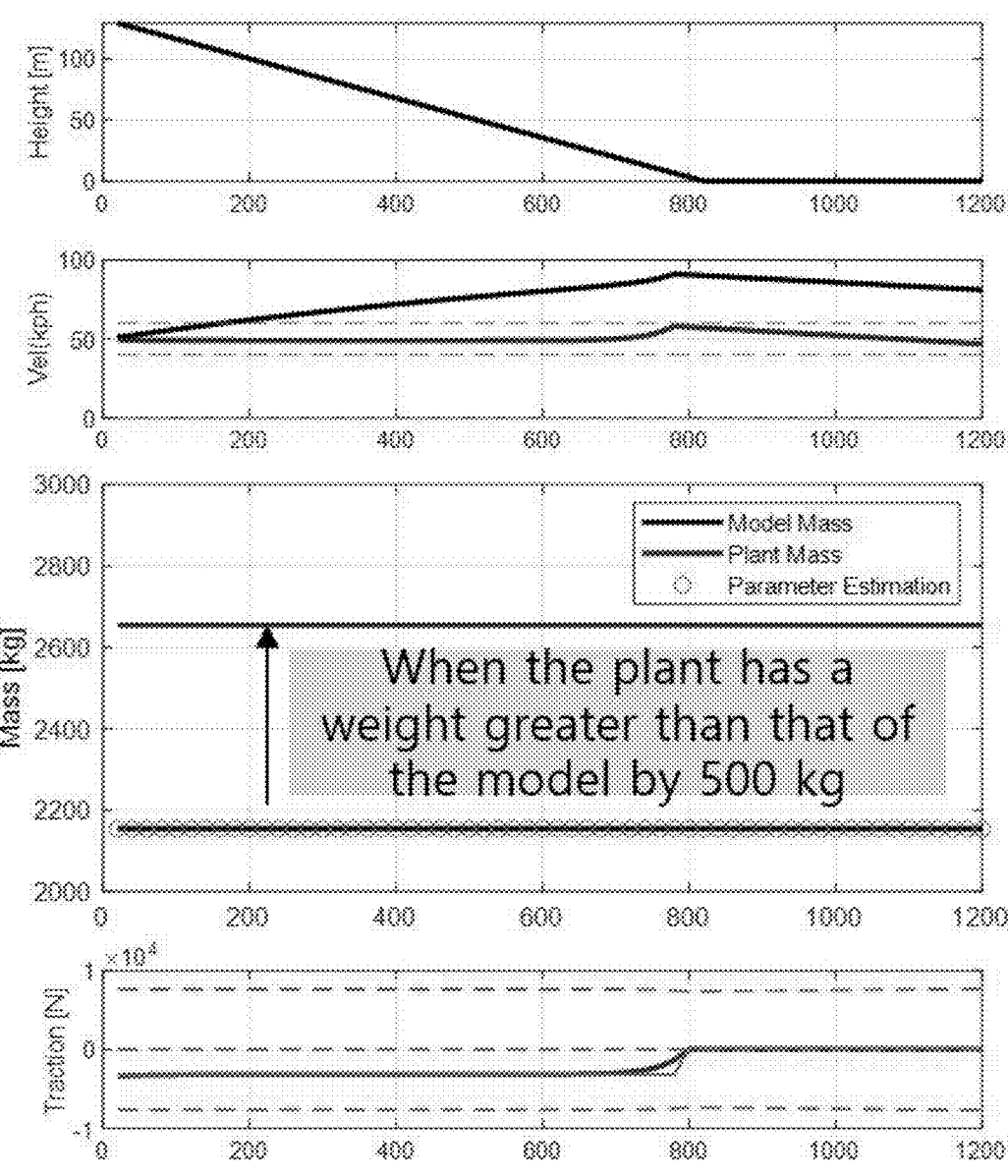
Figure 6C:
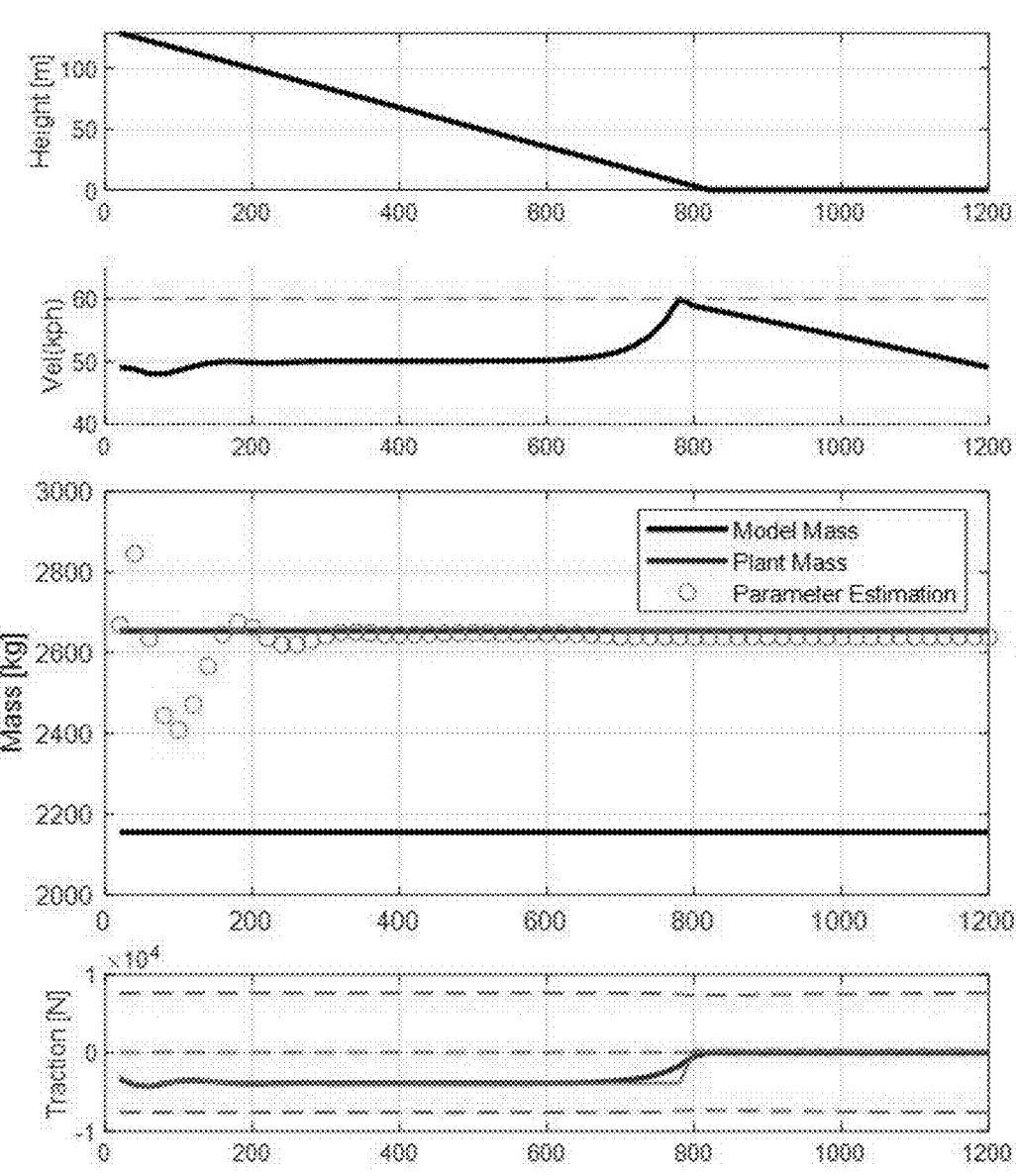

FIG. 6A, FIG. 6B and FIG. 6C are examples of applying the method for controlling driving of an electric vehicle according to various exemplary embodiments of the present disclosure.

FIG. 6A, FIG. 6B and FIG. 6C show, as graphs, results estimated when continuously occurring errors are caused by one parameter based on the method for controlling driving of an electric vehicle according to various exemplary embodiments of the present disclosure.

FIG. 6A, FIG. 6B and FIG. 6C show examples in which a weight which is a model output value output from the control model and a weight which is a vehicle output value output from a plant are different. Results of estimation when a single forgetting factor is set for the example are shown in FIG. 6A, FIG. 6B and FIG. 6C.

FIG. 6A shows a case in which the weights of the control model and the plant are identical. The control model is indicated by a black line, the plant is indicated by a blue line, and parameters are indicated by dotted lines.

FIG. 6B shows results before error estimation when the weights of the control model and the plant are different. Because the plant is heavier than the control model, the results exceed constraints (a maximum vehicle speed) for the same input value.

FIG. 6C shows results before error estimation when the weights of the control model and the plant are different. Because parameters estimated by setting a forgetting factor for continuously occurring errors have been reflected in the control model, stable control is realized.

Figure 7A:
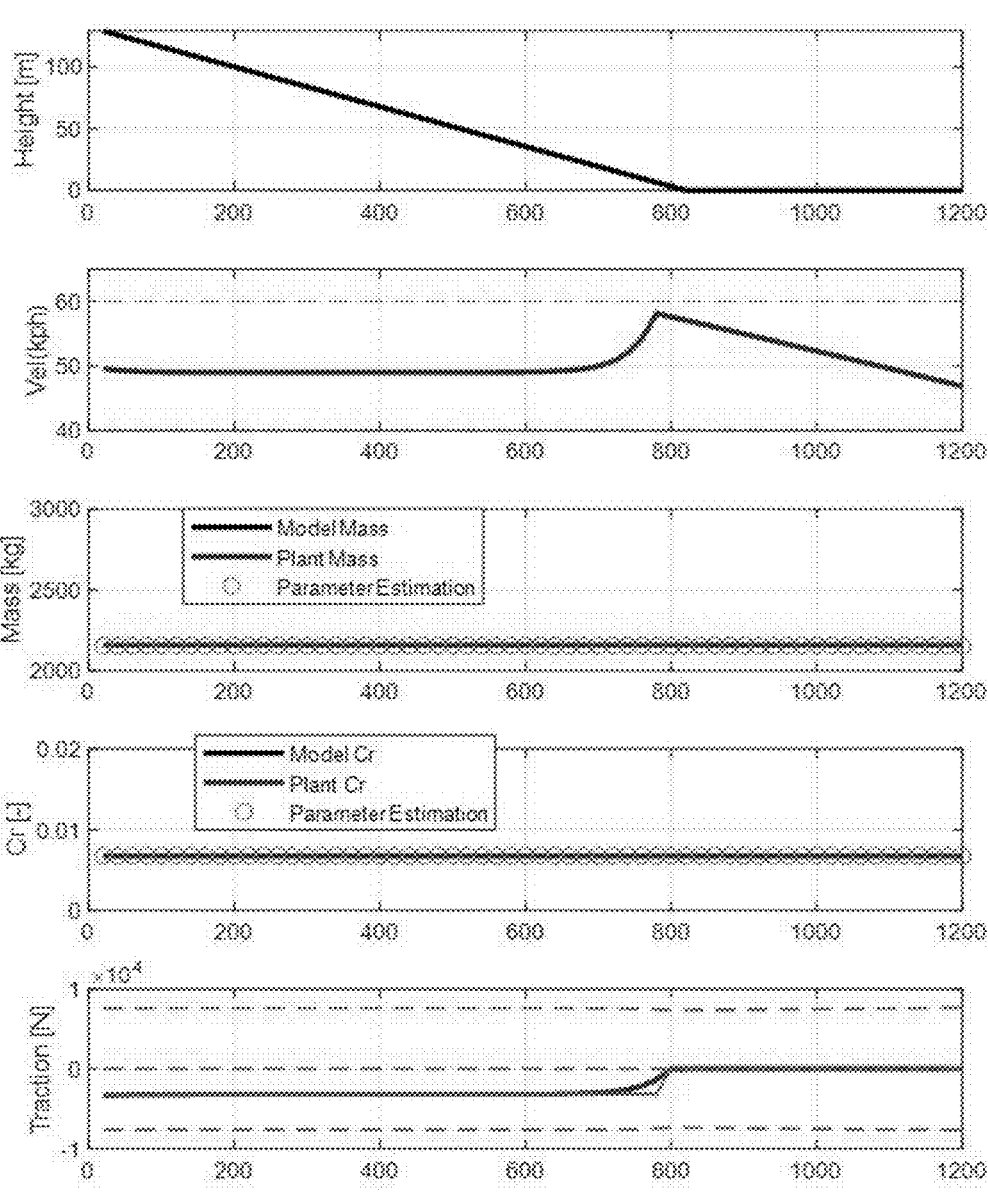
FIG. 7A, FIG. 7B and FIG. 7C are another examples of applying the method for controlling driving of an electric vehicle according to various exemplary embodiments of the present disclosure.
Figure 7B:
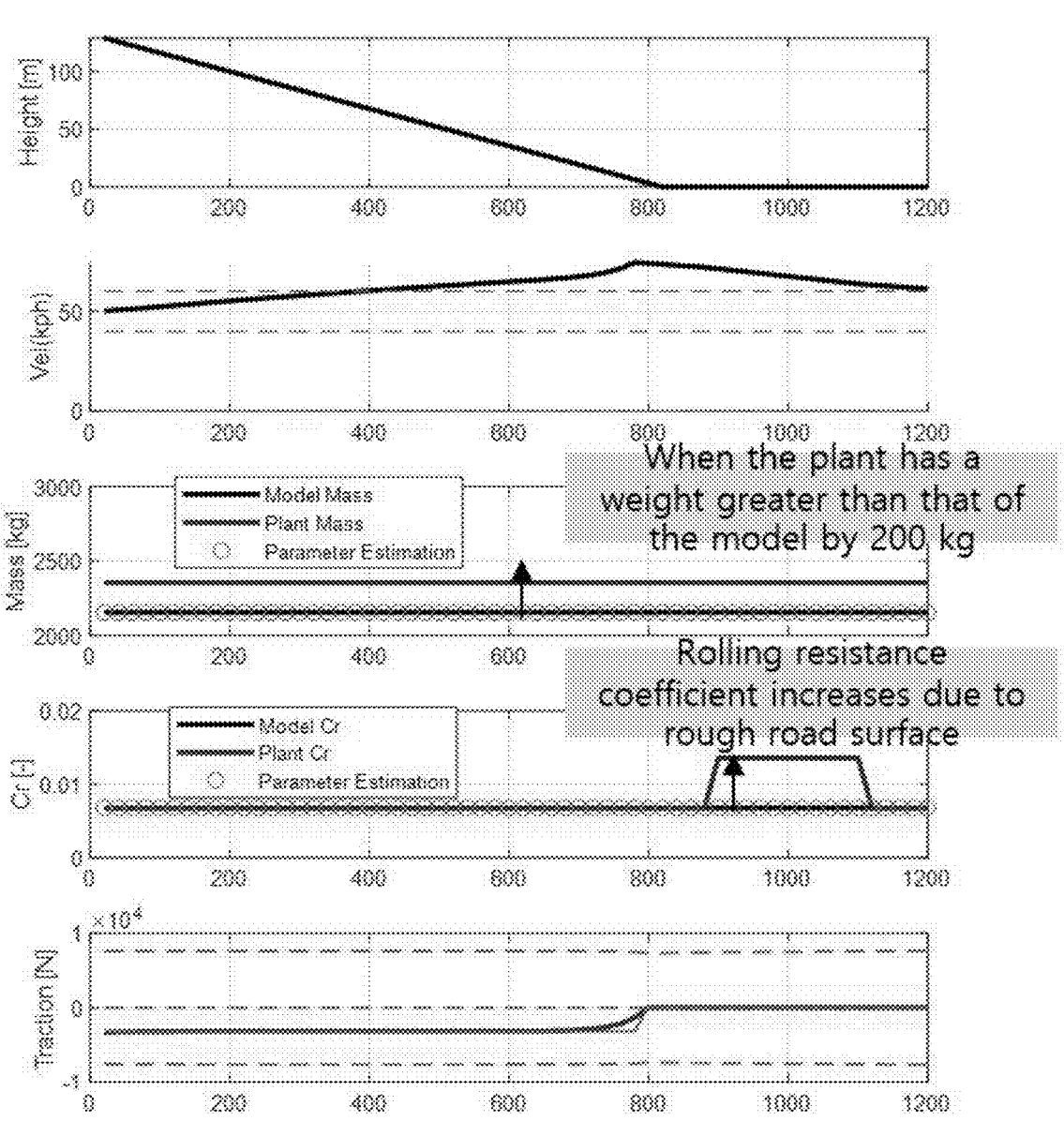
Figure 7C:
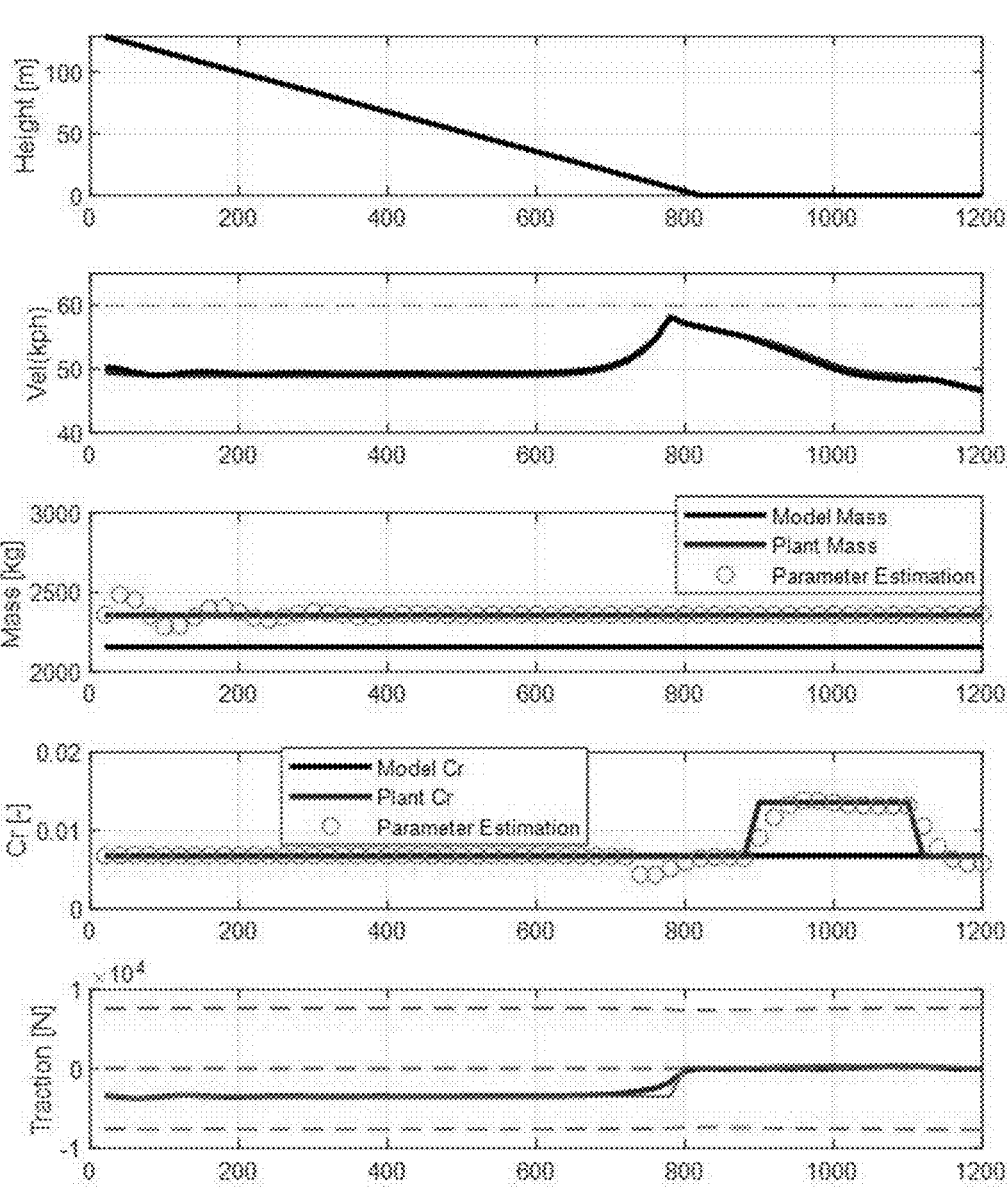

FIG. 7A, FIG. 7B and FIG. 7C are another examples of applying the method for controlling driving of an electric vehicle according to various exemplary embodiments of the present disclosure.

FIG. 7A, FIG. 7B and FIG. 7C show, as graphs, estimation results obtained by reflecting change in road friction characteristics in addition to a weight difference in a vehicle rolling resistance when continuously occurring errors and instantaneously occurring errors are induced based on the method for controlling driving of an electric vehicle according to various exemplary embodiments of the present disclosure.

As shown in FIG. 7A, FIG. 7B and FIG. 7C, the present disclosure adds the estimated results to the weight difference when continuously occurring errors and instantaneously occurring errors are induced, when road friction characteristics change, reflects the present in the vehicle rolling resistance, and performs estimation. FIG. 7A, FIG. 7B and FIG. 7C show estimation results.

Because the weight continuously causes errors, a forgetting factor is set to a large value, and the rolling resistance utilizes a small numerical value because it is a temporary error.

FIG. 7A shows a case in which the control model and the plant are consistent with each other. The control model is indicated by a black line, the plant is indicated by a blue line, and parameters are indicated by dotted lines.

FIG. 7B shows results before error estimation when the weight and rolling resistance of the control model are different from those of the plant. Because the plant is heavy and the rolling resistances are different for the same input value, the results exceed constraints.

FIG. 7C shows results after error estimation when the weight and rolling resistance of the control model are different from those of the plant. Because errors estimated by setting two forgetting factors have been reflected in the control model, stable control is realized.

As described above, the method for controlling driving of an electric vehicle according to the exemplary embodiment of the present disclosure can stably control driving of the electric vehicle when a mismatch between the control model and the plant occurs during longitudinal driving control.

The method for controlling driving of an electric vehicle according to various aspects of the present disclosure are directed to providing a more stable input value because, when all constraints are satisfied, a parameter causing an error may be detected and reflected.

Here, constraints may include satisfying a target vehicle speed band, a driving time being equal to or shorter than a predetermined time period, maintaining a safe distance between vehicles, limiting a maximum vehicle speed on curved roads, and the like.

In the method for controlling driving of an electric vehicle according to various exemplary embodiments of the present disclosure, it is necessary to avoid abrupt change in the vehicle torque which causes deterioration of drivability and comfort because the input of the plant or the control model is based on the torque of the vehicle. Accordingly, the method for controlling driving of an electric vehicle according to various exemplary embodiments of the present disclosure can easily maintain a provided target vehicle speed by detecting and reflecting a parameter causing an error, thereby realizing a stable and smooth torque value.

Furthermore, the method for controlling driving of an electric vehicle according to various exemplary embodiments of the present disclosure can realize a more stable torque value as compared to conventional control methods in a situation in which a mismatch (error) between the control model and the plant inevitably occurs.

Furthermore, the method for controlling driving of an electric vehicle according to various exemplary embodiments of the present disclosure is applicable and may be widely used in other control systems because a compensation process is performed through parameter estimation, and when an estimated parameter loses its physical characteristics due to an unexpected disturbance, the compensation process is switched to the existing offset-free method, as described above.

The present disclosure described above may be implemented as computer-readable code on a medium in which a program is recorded. A computer-readable medium includes all kinds of recording devices in which data readable by a computer system is stored. Examples of the computer-readable medium include a Hard Disk Drive (HDD), a solid state drive (SSD), a silicon disk drive (SDD), a ROM, a RAM, a CD-ROM, a magnetic tape, a floppy disk, an optical data storage device, etc.

Therefore, the above detailed description should not be construed as restrictive in all respects but as exemplary. The scope of the present disclosure should be determined by reasonable interpretation of the appended claims, and all modifications within the equivalent scope of the present disclosure are included in the scope of the present disclosure.

In the electric vehicle according to at least various exemplary embodiments of the present disclosure configured as described above, factors causing errors while driving may be detected, a steady factor may be distinguished from an instant factor in errors, and parameters may be corrected based thereon to improve the stability of control.

Furthermore, the present disclosure can prevent a sudden change in the torque of an electric vehicle to improve drivability and comfort by detecting a parameter causing an error while driving in advance and reflecting the same in advance.

Furthermore, the present disclosure is widely applicable in various environments to improve driving stability and comfort of electric vehicles by performing a compensation process through parameter estimation, and when an estimated parameter loses its physical properties due to unexpected disturbance, switching the parameter in various manners.

Furthermore, the term "unit" or "control unit," as like included in a hybrid control unit, is only a widely used term for a name of a controller configured for controlling a specific function of a vehicle, and does not mean a generic function unit. For example, each unit or control unit may include a communication device configured to communicate with another control device or sensor to control a function assigned thereto, a memory configured to store an operating system or logic command input/output information, and one or more processors configured to perform determination, calculation, decision, etc. necessary for controlling the function assigned thereto.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling driving of an electric vehicle, the method comprising:

determining, by a processor, an error between a vehicle output value, output by the electric vehicle in response to a first input value, and a model output value output by a control model controlling the electric vehicle in response to the first input value;

analyzing, by the processor, the error to derive an error factor causing the error, and classifying the error factor as a steady error factor or an instant error factor according to characteristics of the error;

generating, by the processor, a weight corresponding to a type of the error factor, and generating an estimated parameter by applying the corresponding weight to a parameter; and inputting, by the processor, the estimated parameter in the control model when a predetermined condition is satisfied, controlling the driving of the vehicle based on the estimated parameter input into the control model, and wherein the weight includes:

a first weight to which a first forgetting factor compensating the steady error factor is applied; and a second weight to which a second forgetting factor compensating the instant error factor is applied, wherein the first forgetting factor has a constant value over time, and wherein the second forgetting factor has a decreasing value over time.

2. The method of claim 1, wherein the classifying the error factor comprises determining whether the error factor is included within a preset duration range.

3. The method of claim 2, wherein the classifying the error factor comprises: determining the error factor as the steady error factor when the error factor is included within the preset duration range; and determining the error factor as the instant error factor when the error factor is not included within the preset duration range.

4. The method of claim 1, wherein the predetermined condition includes a first condition in which the first input value is equal to or greater than 5 torque.

5. The method of claim 1, wherein the first forgetting factor and the second forgetting factor are greater than 0 and less than or equal to 1.

6. The method of claim 5, wherein the second forgetting factor has a smaller value than the first forgetting factor.

7. The method of claim 6, wherein the first forgetting factor is set to a value equal to or greater than 0.5 and equal to or less than 1, and the second forgetting factor is set to a value greater than 0 and less than 0.5.

8. The method of claim 1, wherein the predetermined condition includes a second condition in which the estimated parameter is determined to be valid, wherein determining the second condition is satisfied includes determining whether the estimated parameter has lost physical characteristics thereof due to disturbance having completely different characteristics during driving of the electric vehicle.

9. The method of claim 1, wherein the parameter includes a rolling resistance coefficient, an aerodynamic coefficient, a vehicle weight, an influence of wind while driving, and road friction characteristics.

10. A non-transitory computer-readable recording medium recording a program for executing the method for controlling driving of the electric vehicle according to claim 1.

11. An electric vehicle comprising:

a processor for controlling the electric vehicle which is traveling on a road, wherein the processor is configured to:

determine an error between a vehicle output value, output by the electric vehicle in response to a first input value, and a model output value output by a control model controlling the electric vehicle in response to the first input value:

analyze the error to derive an error factor causing the error, and classify the error factor as a steady error factor or an instant error factor according to characteristics of the error:

generate a weight corresponding to a type of the error factor, and generate an estimated parameter by applying the corresponding weight to a parameter; and input the estimated parameter in the control model when a predetermined condition is satisfied, control the driving of the vehicle based on the estimated parameter input into the control model, and wherein the weight includes:

a first weight to which a first forgetting factor compensating the steady error factor is applied; and a second weight to which a second forgetting factor compensating the instant error factor is applied, wherein the first forgetting factor has a constant value over time, and wherein the second forgetting factor has a decreasing value over time.

12. The electric vehicle of claim 11, wherein the processor is configured to classify the error factor by determining whether the error factor is included within a preset duration range.

13. The electric vehicle of claim 12, wherein the processor is configured;

to determine the error factor as the steady error factor when the error factor is included within the preset duration range, and to determine the error factor as the instant error factor when the error factor is not included within the preset duration range.

14. The electric vehicle of claim 11, wherein the predetermined condition includes a first condition in which the first input value is equal to or greater than 0 torque.

15. The electric vehicle of claim 11, wherein the first forgetting factor and the second forgetting factor are greater than 0 and less than or equal to 1.

16. The electric vehicle of claim 15, wherein the second forgetting factor has a smaller value than the first forgetting factor.

17. The electric vehicle of claim 16, wherein the first forgetting factor is set to a value equal to or greater than 0.5 and equal to or less than 1, and the second forgetting factor is set to a value greater than 0 and less than 0.5.

18. The electric vehicle of claim 11, wherein the predetermined condition includes a second condition in which the estimated parameter is determined to be valid, wherein determining the second condition is satisfied includes determining whether the estimated parameter has lost physical characteristics thereof due to disturbance having completely different characteristics during driving of the electric vehicle.

19. The electric vehicle of claim 11, wherein the parameter includes a rolling resistance coefficient, an aerodynamic coefficient, a vehicle weight, an influence of wind while driving, and road friction characteristics.

* * * * *